United States Patent
Hoover et al.

(10) Patent No.: US 11,850,875 B2
(45) Date of Patent: Dec. 26, 2023

(54) COLOR CHANGING EXPIRATION INDICATOR

(71) Applicant: Xerox Corporation, Norwalk, CT (US)

(72) Inventors: Linn C. Hoover, Webster, NY (US);
Erwin Ruiz, Rochester, NY (US);
David A. VanKouwenberg, Avon, NY (US); Paul M. Fromm, Rochester, NY (US); Jeffrey J. Bradway, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 331 days.

(21) Appl. No.: 17/190,498

(22) Filed: Mar. 3, 2021

(65) Prior Publication Data
US 2021/0187988 A1 Jun. 24, 2021

Related U.S. Application Data

(62) Division of application No. 15/924,714, filed on Mar. 19, 2018, now Pat. No. 10,946,682.

(51) Int. Cl.
| | |
|---|---|
| *B05D 7/00* | (2006.01) |
| *B41M 3/00* | (2006.01) |
| *B05D 5/06* | (2006.01) |
| *B41M 7/00* | (2006.01) |
| *G09F 3/00* | (2006.01) |
| *B31D 1/02* | (2006.01) |
| *G06Q 30/06* | (2023.01) |

(52) U.S. Cl.
CPC ............... *B41M 3/005* (2013.01); *B05D 5/06* (2013.01); *B05D 7/587* (2013.01); *B31D 1/027* (2013.01); *B41M 3/001* (2013.01); *B41M 7/009* (2013.01); *B41M 7/0081* (2013.01); *G06Q 30/06* (2013.01); *G09F 3/0291* (2013.01); *B41M 2205/40* (2013.01)

(58) Field of Classification Search
None
See application file for complete search history.

(56) References Cited

U.S. PATENT DOCUMENTS

| | | | | |
|---|---|---|---|---|
| 4,830,855 A | * | 5/1989 | Stewart | A61K 9/2027 424/416 |
| 2006/0130734 A1 | * | 6/2006 | Koivukunnas | G01N 31/229 374/E3.004 |

\* cited by examiner

*Primary Examiner* — Charles Capozzi
(74) *Attorney, Agent, or Firm* — Bell & Manning, LLC

(57) ABSTRACT

A method includes printing, by one or more printer heads of the printing system, a reactive layer onto print media. The method also includes printing, by the one or more printer heads, a determined number of transmission layers and a determined number of barrier layers in alternation with one another. At least a portion of the reactive layer is configured to migrate through the transmission layers. The method further includes printing, by the one or more printer heads, a reactant layer that is configured to change color responsive to a reaction that occurs between the reactant layer and the reactive layer upon migration of the reactive layer through the determined number of transmission layers. The reaction is configured to occur on a received expiration date.

12 Claims, 5 Drawing Sheets

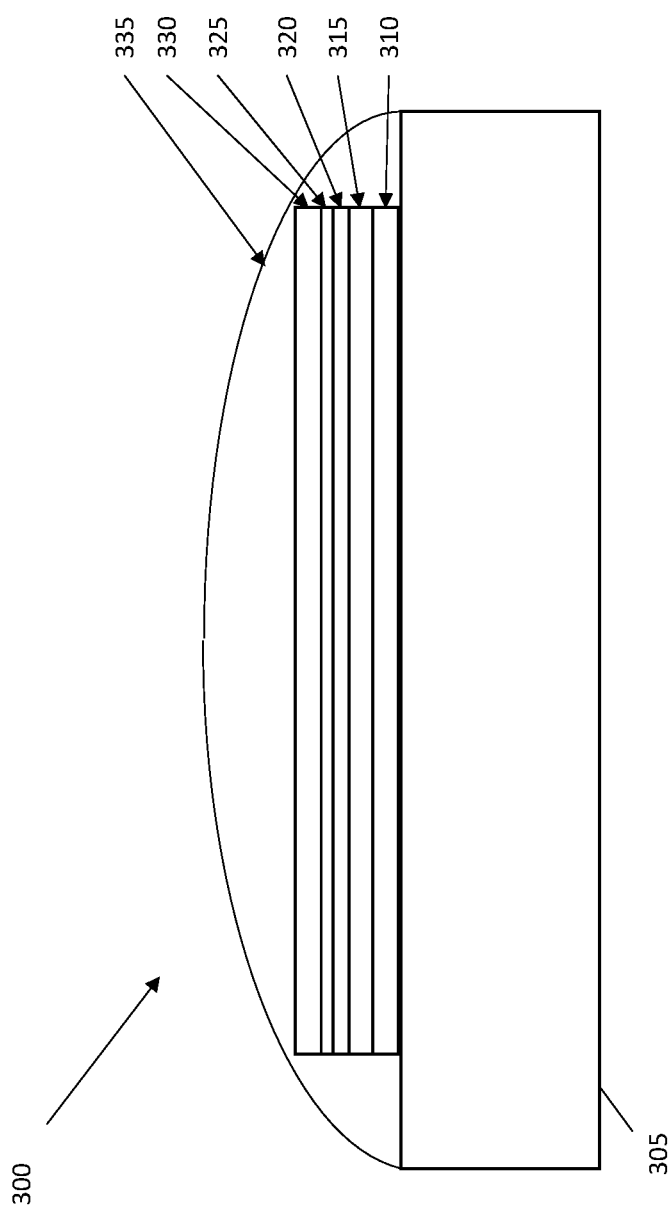

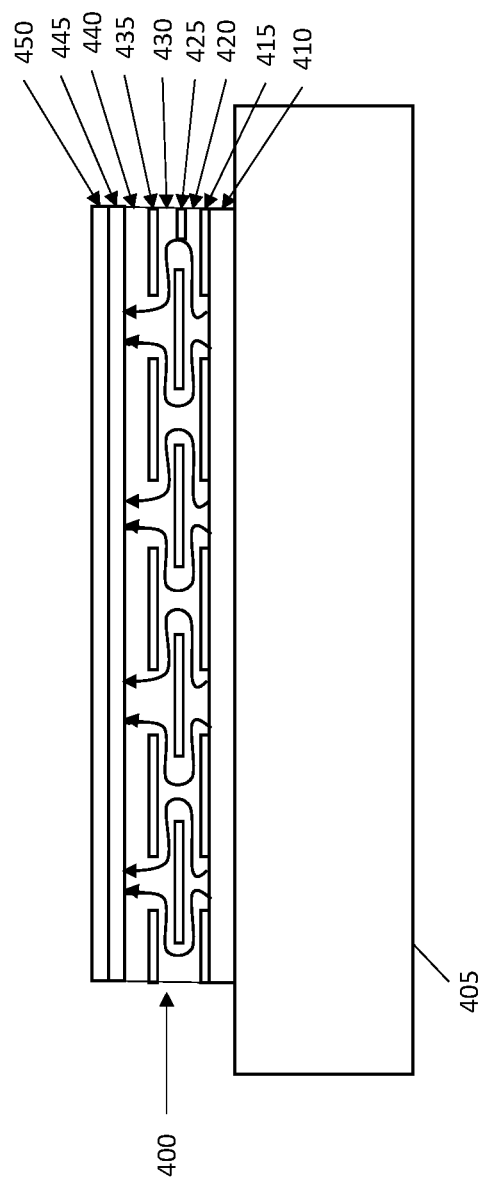

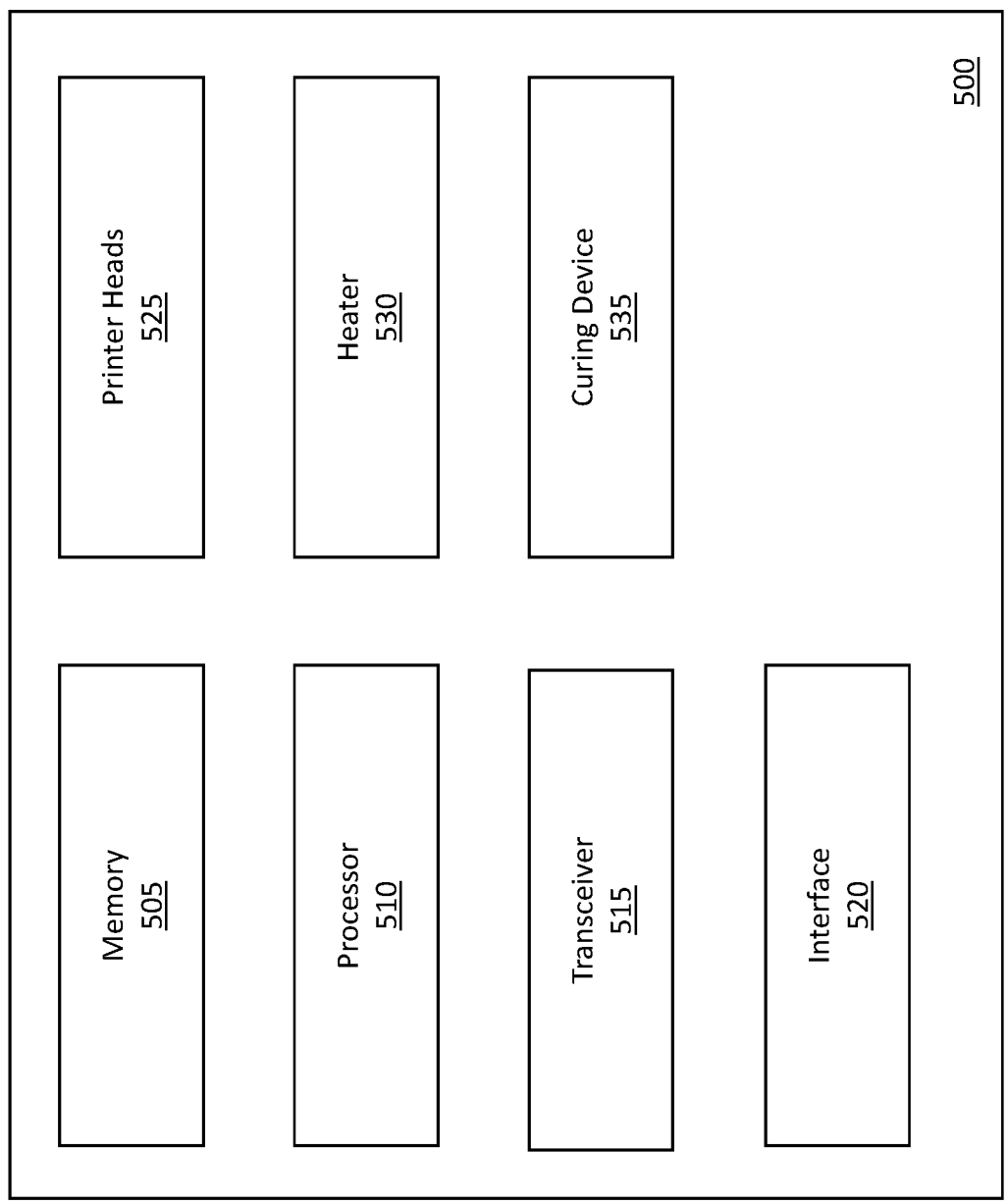

COLOR CHANGING EXPIRATION INDICATOR

CROSS-REFERENCE TO RELATED APPLICATION

The present application claims priority as a divisional application of U.S. patent application Ser. No. 15/924,714 filed on Mar. 19, 2018, the entire disclosure of which is incorporated by reference herein.

TECHNICAL FIELD

The present application is directed to an expiration tag or other indicator that is configured to change its appearance after a predetermined amount of time to indicate that a product has reached its expiration date.

BACKGROUND

Many consumer products have a limited useful life. For example, various food products, medicinal products, medical devices, chemicals, etc. may become ineffective and/or hazardous if they are not used within a certain amount of time from the date on which they are produced. As a result, product manufacturers often include an expiration date on products that have a predictable shelf life. The expiration date can be printed or stamped onto product packaging or a product label. For some products, the expiration date can also be accessed online based on a product identification number.

SUMMARY

An illustrative printer system in accordance with embodiments described herein includes a memory, and one or more printer heads, and a processor in communication with the memory and the one or more printer heads. The processor is configured to determine a number of transmission layers to use in a color changing expiration indicator based at least in part on a time period between a print date of the color changing expiration indicator and a received expiration date. The processor is also configured to determine a number of barrier layers to use in the color changing expiration indicator based at least in part on the time period. The one or more printer heads are configured to print a reactive layer onto print media, where at least a portion of the reactive layer is configured to migrate through the transmission layers. The one or more printer heads are also configured to print the determined number of transmission layers and the determined number of barrier layers in alternation with one another. The one or more printer heads are further configured to print a reactant layer that is configured to change color responsive to a reaction that occurs between the reactant layer and the reactive layer upon migration of the reactive layer through the determined number of transmission layers, where the reaction is configured to occur on the received expiration date.

An illustrative method in accordance with embodiments described herein includes receiving, by an interface of a printer system, an expiration date. The method also includes determining, by a processor of the printer system, a number of transmission layers to use in a color changing expiration indicator based at least in part on a time period between a print date of the color changing expiration indicator and the received expiration date. The method also includes determining, by the processor, a number of barrier layers to use in the color changing expiration indicator based at least in part on the time period. The method also includes printing, by one or more printer heads of the printing system, a reactive layer onto print media. At least a portion of the reactive layer is configured to migrate through the transmission layers. The method also includes printing, by the one or more printer heads, the determined number of transmission layers and the determined number of barrier layers in alternation with one another. The method further includes printing, by the one or more printer heads, a reactant layer that is configured to change color responsive to a reaction that occurs between the reactant layer and the reactive layer upon migration of the reactive layer through the determined number of transmission layers. The reaction is configured to occur on the received expiration date.

Another illustrative printer system in accordance with embodiments described herein includes a memory, an interface, one or more printer heads, and a processor in communication with the memory, the interface, and the one or more printer heads. The interface is configured to receive an expiration date. The processor is configured to determine a number of transmission layers to use in a color changing expiration indicator based at least in part on a time period between a print date of the color changing expiration indicator and the received expiration date. The processor is also configured to determine a thickness for each of the transmission layers based at least in part on the time period. The processor is also configured to determine a number of barrier layers to use in the color changing expiration indicator based at least in part on the time period. The processor is further configured to determine a thickness for each of the barrier layers based at least in part on the time period. The processor is further configured to determine a porosity for each of the barrier layers. The processor is further configured to determine a thickness of a reactive layer based at least in part on the determined number of transmission layers and the determined number of barrier layers. The one or more printer heads are configured to print the reactive layer onto print media, where at least a portion of the reactive layer is configured to migrate through the transmission layers. The one or more printer heads are also configured to print the determined number of transmission layers and the determined number of barrier layers in alternation with one another. The one or more printer heads are further configured to print a reactant layer that is configured to change color responsive to a reaction that occurs between the reactant layer and the reactive layer upon migration of the reactive layer through the determined number of transmission layers. The reaction is configured to occur on the received expiration date.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 is a side view depicting layers of a color changing expiration indicator in accordance with an illustrative embodiment.

FIG. 4 is a cross-sectional view depicting layers of a color changing expiration indicator in accordance with an illustrative embodiment.

FIG. 5 is a block diagram depicting a printer system that is configured to generate color changing expiration indicators in accordance with an illustrative embodiment.

DETAILED DESCRIPTION

As discussed above, expiration dates are often printed or stamped onto product packaging or labels to indicate a useful life of the product. However, traditional expiration dates can be difficult to locate as they are often printed in locations that are difficult for a consumer to find, such as the bottom of a product or a portion of the product packaging or label which is discarded by the consumer. Even if the consumer is able to locate the expiration date, the date itself can be difficult for the consumer to read due to small print, smudged print, fading, etc. This practice makes it difficult for consumers to know when the products that they purchase have reached the end of their useful life. As a result, consumers often throw away still usable products, or end up using expired products which can result in health and safety issues.

Described herein are methods and systems for generating color changing expiration indicators. In an illustrative embodiment, the color changing expiration indicators can be in the form of printed adhesive tags that utilize alternating layers of printed material to effect a color change after a predetermined period of time has gone by. Specifically, material from a reactive layer migrates over time through one or more barrier layers and one or more transmission layers of material until the reactive layer material reacts with a reactant layer and causes the reactant layer to change color. The amount of time that it takes for the reactive layer material to migrate through the other layers is controlled by the thickness and number of layers such that the color change reaction occurs at a specified expiration date. The adhesive tags can be placed on any prominent or easily viewable portion of the product such that the consumer can quickly and easily determine whether the product has expired based on the color of the adhesive tag.

Figure 1:
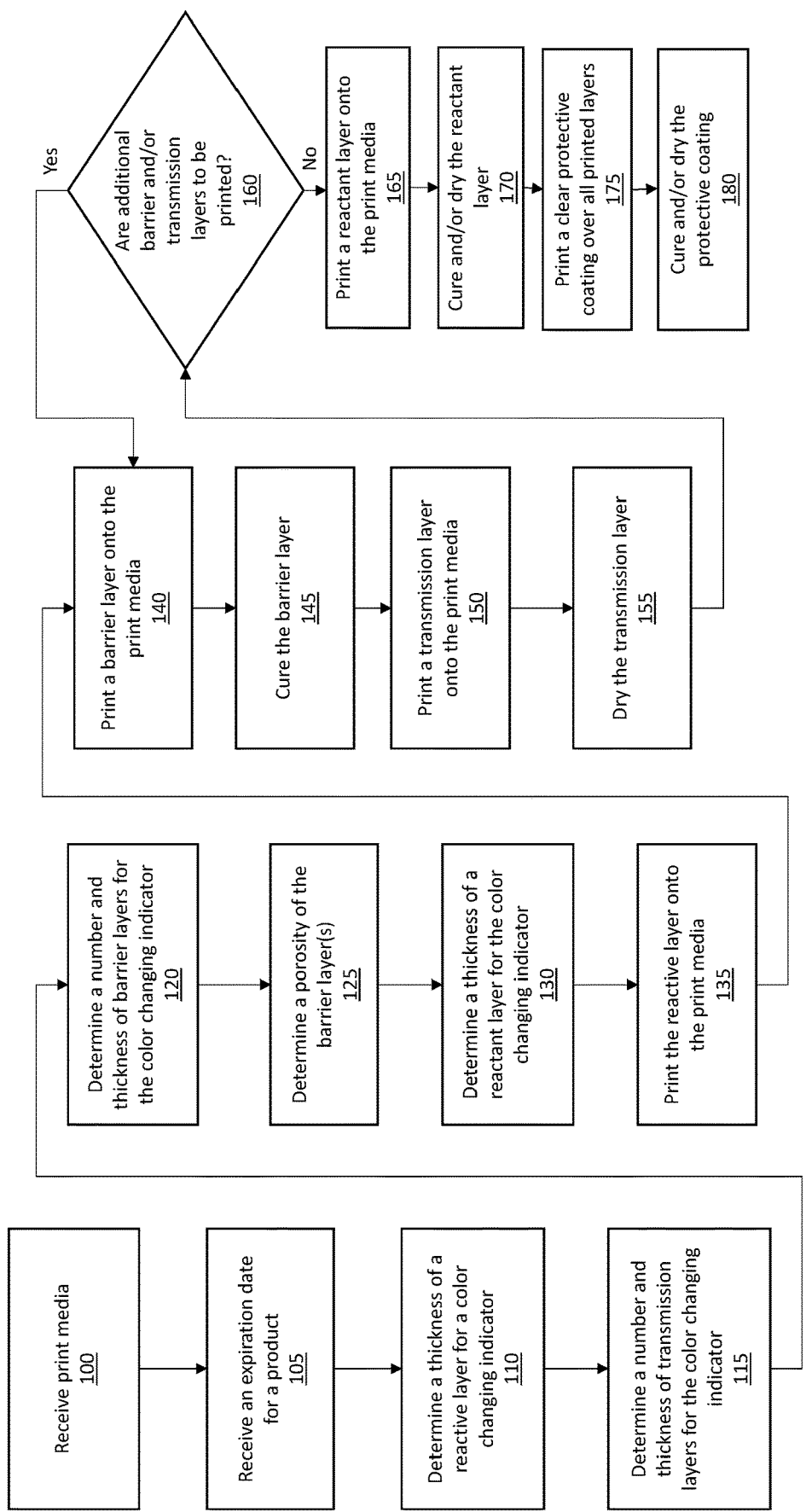
FIG. 1 is a flow diagram depicting operations performed by a printer system to generate color changing expiration indicators in accordance with an illustrative embodiment.

FIG. 1 is a flow diagram depicting operations performed by a printer system to generate color changing expiration indicators in accordance with an illustrative embodiment. In alternative embodiments, fewer, additional, and/or different operations may be performed. Additionally, the use of a flow diagram is not meant to be limiting with respect to the order of operations performed. In an operation 100, the printer system receives print media. In an illustrative embodiment, the print media can be in the form of a roll (or strip) of adhesive tags on a waxed or other backing that allows the adhesive tags to be easily removed and applied to a product once they are printed. The print media can be fed into the printer system by a system operator.

Figure 2:
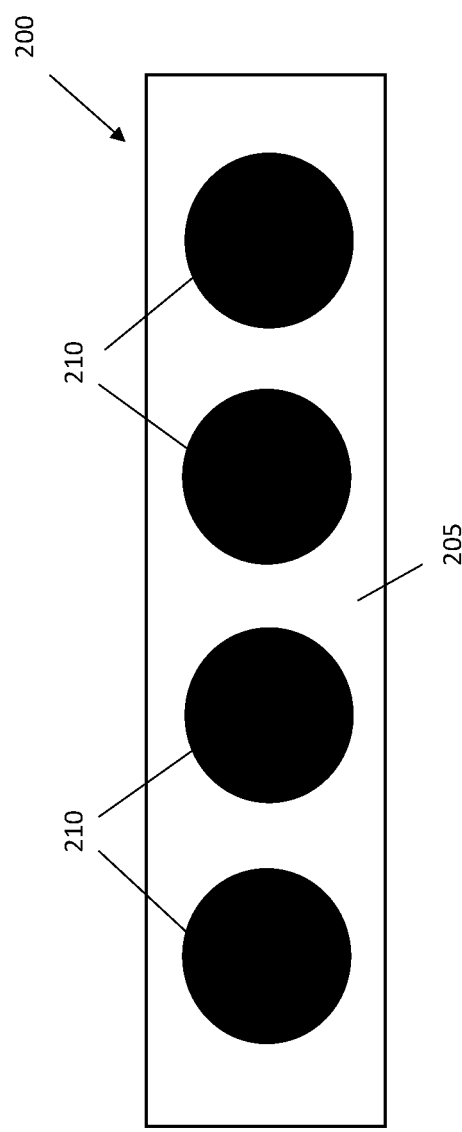
FIG. 2 depicts a portion of print media used to generate color changing expiration indicators in accordance with an illustrative embodiment.

FIG. 2 depicts a portion of print media 200 used to generate color changing expiration indicators in accordance with an illustrative embodiment. The print media 200 includes a backing 205 and a plurality of adhesive tags 210. The backing 205 can be a waxed paper or any other type of backing that allows easy removal of the adhesive tags 210. Each of the adhesive tags 210 has an adhesive applied to its back side such that the tags stick to the backing 205. Any type of adhesive(s) known in the art can be used. The adhesive also allows the adhesive tags 210 to be applied to a product once the tag is printed. The adhesive tags can be made from mylar, other plastic materials, paper, and/or any other material upon which a color changing expiration indicator can be printed. While FIG. 2 depicts 4 adhesive tags 210 and the backing 205, it is to be understood that the print media 200 can include any number of the adhesive tags 210. For example, the print media 200 can include a single adhesive tag, 5 adhesive tags, 1000 adhesive tags, etc. Additionally, although FIG. 2 depicts the adhesive tags 210 as having a circle shape, any other shape may be used in alternative embodiments such as square, rectangle, oval, triangle, etc.

Referring back to FIG. 1, the printer system receives an expiration date for a product in an operation 105. In an illustrative embodiment, the expiration date can be received from a system operator through an interface of the printer system, such as a touch screen, keypad, etc. The expiration date can also be received from a computing device through a transceiver of the printer system. For example, a user device may transmit the expiration date to the printer system through a networked connection, such as the Internet, Bluetooth®, or a local area network (LAN). The expiration date can originate from a product manufacturer, end user, or other entity based on the expected useful and safe life of the product.

In operations 110-130, the printer system makes determinations regarding the number of layers to be included in the color changing indicator, the thickness of the layers, and the porosity of the barrier layers. These determinations are based on the expiration date and the specific interactions between the inks used to print the transmission and barrier layers. The printer system can include algorithms and/or look-up tables to determine an optimal configuration for the color changing indicator based on the amount of time before the indicator is to change color. For example, the printer system can use a lookup table containing parameters that define the absorption rates of the reactant layer through a barrier layer of a specific thickness and porosity, and through a transmission layer of a specific thickness. The operations 110-130 can be performed in parallel, in series, or in any order based on the specific algorithm(s) used to make the determinations.

In an operation 110, the printer system determines a thickness of a reactive layer for the color changing indicator. In an illustrative embodiment, the reactive layer can be an aqueous acidic fluid capable of being jetted by a print head. Alternatively, the reactive layer may be basic. Any type of acidic or basic ink known in the art may be used. A thickness of the reactive layer is based in part on a number and thickness of other layers that the reactive layer is to traverse, which in turn depends on the desired expiration date (i.e., the amount of time that is to elapse before a color change reaction occurs). A thicker reactive layer will typically be used to traverse thicker and/or numerous barrier layers, which may be used for expiration dates which are longer term. Likewise, a thinner reactive layer can be used to traverse thinner and/or less numerous barrier layers, which may be used for expiration dates which are shorter term. In an illustrative embodiment, the reactive layer thickness can vary from approximately five microns to in excess of one hundred microns. Alternatively, other thicknesses may be used.

In an operation 115, the printer system determines a number and thickness of transmission layers for the color changing indicator. In an illustrative embodiment, the transmission layer can be a pH neutral aqueous fluid. Each of the transmission layers can be a printable layer of material that absorbs the reactive layer over a predictable amount of time. The amount of time that it takes the aforementioned reactive layer to traverse each transmission layer depends in part on the thickness and number of transmission layers, which can be determined by the printer system using algorithms and/or look-up tables. For example, if an expiration date is near term (e.g., 2 weeks), a single, relatively thin transmission layer may be used. Conversely, if the expiration date is longer term (e.g., 18 months), two or more transmission layers of moderate or heavy thickness may be used. In an illustrative embodiment, each transmission layer can range in thickness from approximately five microns to thirty microns. Alternatively, other thicknesses may be used. In another illustrative embodiment, if multiple transmission layers are used, each of the transmission layers can have the same thickness. In alternative embodiments, different transmission layers within a given color changing expiration indicator may have different thicknesses.

In an operation 120, the printer system determines a number and thickness of barrier layers for the color changing indicator. Each of the barrier layers can be a printable ultraviolet (UV) curable layer composed of material that inhibits transport of the reactive layer. The barrier layer(s) can be positioned adjacent to and/or in between transmission layers. The number of barrier layers can be based on the number of transmission layers that are to be used. The thickness of the barrier layer can be based on a thickness and/or type of the transmission layer to control the rate at which the reactive layer is able to traverse through the barrier layer(s). In one embodiment, a predetermined thickness can be used for each barrier layer. In an illustrative embodiment, the barrier layer can range in thickness from approximately ten microns to fifty microns. Alternatively, other thicknesses may be used. In another illustrative embodiment, if multiple barrier layers are used, each of the barrier layers can have the same thickness. In alternative embodiments, different barrier layers within a given color changing expiration indicator may have different thicknesses.

In an illustrative embodiment, each barrier layer includes pores through which the material that forms the reactive layer is able to traverse. The pores can be filled with the material that forms the transmission layer such that movement of the reactive layer material is not entirely prevented by the barrier layer. In an operation 125, the printer system determines a porosity of the barrier layers, which can include a pore size, a pore shape, and/or a pore pattern. In an illustrative embodiment, the pore pattern can be a uniform distribution with equal spacing between pores. Alternatively, a non-uniform distribution may be used. In another illustrative embodiment, the pores can be relatively circular and can range from approximately 5 microns to approximately 200 microns in diameter. In alternative embodiments, other pore sizes may be used. Similarly, other pore shapes can be used, such as square, rectangle, triangle, oval, etc. The porosity is determined based on the amount of time that it should take for the reactive layer material to work its way through the pores of the barrier layer into a subsequent layer. For example, small pores that are few in number will inhibit transport of the reactive layer material for a longer period of time than large and/or numerous pores.

In an illustrative embodiment, if the color changing indicator includes 2 or more barrier layers, the pores of each barrier layer can be offset relative to the pores in adjacent barrier layers. For example, a color changing indicator can include a first barrier layer adjacent to a reactive layer, a transmission layer adjacent to (e.g., on top of) the first barrier layer, and a second barrier layer adjacent to (e.g., on top of) the transmission layer. The first barrier layer can include a first pore pattern that the reactive layer material traverses and the second barrier layer can include a second pore pattern such that pores of the second barrier layer are offset relative to the pores in the first barrier layer. As a result, the reactive layer material is forced to traverse the transmission layer both laterally across an area of the color changing indicator and vertically through a thickness of the color changing indicator. This configuration is depicted and described in more detail with reference to FIG. 4.

In an operation 130, the printer system determines a thickness of a reactant layer for the color changing indicator. In an illustrative embodiment, the reactant layer can be a clear aqueous ink layer that is configured to react with and change color in the presence of the material from the reactive layer. In one embodiment, the reactive layer can be acidic and the reactant layer can be basic. Alternatively, the reactive layer may be basic and the reactant layer can be acidic. In another alternative embodiment, any other types of materials and/or reactions can be used to effect the color change. The thickness of the reactant layer can be based on the type of material used for the reactant layer and/or the type of material used for the reactive layer.

The printer system prints the reactive layer onto the print media in an operation 135. The reactive layer is printed in accordance with the determination made in the operation 110. In an illustrative embodiment, the printer system can include multiple print heads, at least one of which is configured to print the reactive layer. Depending on the type and thickness of material used for the reactive layer, the printer system may jet one or more layers of reactive material and cure and/or heat dry each reactive layer prior to application of a subsequent layer.

In an operation 140, the printer system prints a barrier layer onto the print media. Specifically, the barrier layer can be printed on top of the reactive layer printed in the operation 135 using one or more barrier layer print heads. The barrier layer is printed in accordance with the determinations made in the operations 120 and 125. In an operation 145, the printer system cures the barrier layer. The barrier layer can be cured using a curing device such as a UV light-emitting diode (LED) curing station. Alternatively, any other type of light source may be used to cure the barrier layer.

In an operation 150, the printer system prints a transmission layer onto the print media. Specifically, the transmission layer is printed on top of the barrier layer and is configured to fill the pores of the barrier layer. In some embodiments, the transmission layer may be printed directly onto the reactive layer prior to printing of a barrier layer. The transmission layer can be printed in accordance with the determinations made in the operation 115. In an operation 155, the printer system dries the transmission layer using a drying station such as an infrared (IR) drying station. Alternatively, any other heat source may be used. Additionally, the printer system may use air impingement to dry the transmission layer. The air impingement can be used in addition to the heat source or in place of the heat source.

In an operation 160, the printer system makes a determination regarding whether additional barrier and/or transmission layers are to be printed based on the determinations made in the operations 115 and 120. If it is determined that additional barrier and/or transmission layers are to be printed, the printer system is configured to repeat the operations 140 and 145 and/or the operations 150 and 155. For example, the printer system may determine that the use of two barrier layers and two transmission layers will result in a color change at the appropriate time. In such an embodiment, the operations 140-155 are each performed twice. Alternatively, the printer system may determine that the use of three transmission layers and two barrier layers will result in a color change at the appropriate time. In such an embodiment, the operations 140 and 145 are performed twice and the operations 150 and 155 are performed three times.

If the printer system determines that no more barrier or transmission layers are to be printed, the printer system prints a reactant layer onto the print media in an operation 165. Specifically, the reactant layer is printed onto the last printed barrier layer or transmission layer using one or more dedicated print heads. Depending on the type of material used and its thickness, the printer system may also cure and/or dry the reactant layer in an operation 170. The reactant layer can be printed as a solid layer that is configured to change color upon a chemical reaction with the reactive layer material. Alternatively, the reactant layer can be printed as a pattern or as text that will appear as a result of the reaction to inform the user that the product is expired. For example, the reactant layer can be printed as text which states "THIS PRODUCT IS EXPIRED, DO NOT USE" or something similar. The text can be invisible to the user until the color change reaction occurs.

In an alternative embodiment, the final barrier layer can be printed as a stencil and overprinted with a solid reactant layer. A text or symbol can appear prior to the expiration date as the reactive layer interacts with the reactant layer and then turn to a solid color as the reactive layer disperses throughout the reactant layer.

In an operation 175, the printer system prints a pH neutral UV curable clear protective coating over all of the other printed layers. The protective coating can be used to form a UV shell, and one or more dedicated print heads can be used to print the protective coating. The protective coating is used to support and protect the color changing expiration indicator and to prevent any environment conditions such as heat, sunlight, radiation, etc. from interfering with the color change reaction. In an illustrative embodiment, the protective coating is applied such that it covers all exposed surfaces of the color changing indicator. Depending on the type of material used, the protective coating may also be cured and/or dried in an operation 180.

Once the label is printed, it can be removed from the backing and applied to a product. In at least some embodiments, the printed label is accompanied by an indication of its purpose and the expected result. For example, a written indication can be placed proximate to or printed directly on the printed label to inform users that the product expires when the label changes from a color A to a color B, where A and B can be any colors. If the reactant layer is printed in the form of text, the written indication can indicate that text will appear upon expiration of the product. In alternative embodiments, such an indication may not be included.

FIG. 3 is a side view depicting layers of a color changing expiration indicator 300 in accordance with an illustrative embodiment. The color changing expiration indicator 300 includes a plurality of layers which are printed onto a substrate 305. In an illustrative embodiment, the substrate 305 can be any of the forms of print media described herein. The color changing expiration indicator 300 includes a reactive layer 310, a first barrier layer 315, a transmission layer 320, a second barrier layer 325, a reactant layer 330, and a protective coating 335. In alternative embodiments, fewer, additional, and/or different layers may be included depending on the type(s) of materials used and the desired expiration date. For example, in an alternative implementation, the first barrier layer 315 can instead be a first transmission layer, the transmission layer 320 can instead be a barrier layer, and the second barrier layer 325 can instead be a second transmission layer.

FIG. 4 is a cross-sectional view depicting layers of a color changing expiration indicator 400 in accordance with an illustrative embodiment. The color changing expiration indicator 400 is printed on a substrate 405, which can be any of the forms of print media described herein. The color changing expiration indicator 400 includes a reactive layer 410, a first barrier layer 415, a first transmission layer 420, a second barrier layer 425, a second transmission layer 430, a third barrier layer 435, a third transmission layer 440, a reactant layer 445, and a protective coating 450. In alternative embodiments, fewer, additional, and/or different layers may be used depending on the expiration date and types of materials used.

As depicted in FIG. 4, each of the barrier layers (415, 425, and 435) is a porous layer in which the pores are filed with material of the transmission layers. As also depicted, the pores of the second barrier layer 425 are offset relative to the pores of the first barrier layer 415 and the pores of the third barrier layer are offset relative to the pores of the second barrier layer 425. The reactant layer material is therefore forced to traverse the other layers of the color changing expiration indicator 400 by moving both laterally and vertically (in the orientation of FIG. 4). The movement of the reactant layer material is depicted by arrows in FIG. 4.

FIG. 5 is a block diagram depicting a printer system 500 that is configured to generate color changing expiration indicators in accordance with an illustrative embodiment. The printer system 500 includes a memory 505, a processor 510, a transceiver 515, an interface 520, printer heads 525, a heater 530, and a curing device 535. In alternative embodiments, the printer system 500 may include fewer, additional, and/or different components.

The memory 505 of the printer system 500 can be used to store any algorithms, programs, etc. to implement the operations described herein. The memory 505 can include one or more computer memories which can be distributed or at a single location, and can be any type(s) of computer memory known in the art. In one embodiment, the memory 505 can be used to store an algorithm for determining the number of layers and the thickness of layers for a color changing expiration indicator based on a specified expiration date. The processor 510 can include one or more processors which can be distributed or at a single location, and can be any type(s) of processor known in the art. In an illustrative embodiment, the processor 510 can be used to execute any programs, algorithms, computer-readable instructions, etc. stored in the memory 505 or otherwise accessible to the printer system 500. The processor 510 can also be used to control the transceiver 515 and/or to process inputs received through the interface 520.

The transceiver 515 can include any type of receiver and/or any type of transmitter known in the art. The transceiver 515 can be used to communicate with user devices, other printer systems, etc. over a network. The interface 520 allows a user to interact with the printer system 500 and input expiration dates and other information. The interface 520 can include a touch screen, a local or remote graphical user interface (GUI), a mouse, a keypad, a speaker, a microphone, a display, etc.

The printer heads 525 can be any type of printer heads or jets known in the art. In an illustrative embodiment, the printer heads 525 include one or more printer heads dedicated to printing reactive layers, one or more printer heads dedicated to printing barrier layers, one or more printer heads dedicated to printing transmission layers, one or more printer heads dedicated to printing reactant layers, and one or more printer heads dedicated to printing protective layers.

The heater 530 can include an infrared heater and/or an air impingement system (such as a fan) to assist in drying the transmission layer(s) after they are applied. Alternatively, any other types of heating and/or blowing components may be used. The curing device 535 can be a UV curing device that utilizes one or more LEDs to cure the barrier layer(s) included in the color changing expiration indicator. Alternatively, any other type of curing device may be used.

The methods and systems described herein can be used by a product supplier and/or by an end user such as a consumer that purchases a product. Additionally, although the systems and methods disclosed herein have been described primarily in the context of an expiration indicator for a product, the disclosed methods and systems are not so limited. For example, the color changing expiration indicators can also be used for other purposes, such as to indicate when a security clearance badge has expired, to indicate when a credit card has expired, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method comprising:
   receiving, by an interface of a printer system, an expiration date;
   determining, by a processor of the printer system, a number of transmission layers to use in a color changing expiration indicator based at least in part on a time period that commences on a print date of the color changing expiration indicator and that ends on the received expiration date; and
   determining, by the processor, a number of barrier layers to use in the color changing expiration indicator based at least in part on the time period;
   determining, by the processor, a thickness of a reactive layer to use in the color changing expiration indicator based at least in part on the determined number of transmission layers and the determined number of barrier layers; and
   printing, by the printer system, the color changing expiration indicator that includes the reactive layer, the determined number of transmission layers, and the determined number of barrier layers.

2. The method of claim 1, further comprising determining, by the processor, a thickness for each of the determined number of transmission layers, wherein the thickness is based at least in part on the time period.

3. The method of claim 1, further comprising determining, by the processor, a thickness for each of the determined number of barrier layers based at least in part on the time period.

4. The method of claim 1, further comprising determining, by the processor, a porosity for each of the determined number of barrier layers.

5. The method of claim 4, wherein determining the porosity for each of the determined number of barrier layers comprises determining a size of pores included in the determined number of barrier layers.

6. The method of claim 4, wherein determining the porosity for each of the determined number of barrier layers comprises determining a pattern of pores included in the determined number of barrier layers.

7. The method of claim 6, wherein determining the pattern of pores comprises determining a first pore pattern for a first barrier layer and a second pore pattern for a second barrier layer, wherein the first pore pattern differs from the second pore pattern.

8. The method of claim 7, further comprising determining the first pore pattern and the second pore pattern such that pores of the second barrier layer are offset relative to the pores in the first barrier layer.

9. The method of claim 4, wherein determining the porosity for each of the determined number of barrier layers comprises determining a number of pores included in the determined number of barrier layers.

10. A method comprising:
    determining, by a processor of a printer system, a number of transmission layers to use in a color changing expiration indicator based at least in part on a time period that commences on a print date of the color changing expiration indicator and that ends on an expiration date;
    determining, by the processor, a thickness for each of the determined number of transmission layers based at least in part on the time period;
    determining, by the processor, a number of barrier layers to use in the color changing expiration indicator based at least in part on the time period;
    determining, by the processor, a thickness for each of the determined number of barrier layers based at least in part on the time period;
    determining, by the processor, a porosity for each of the determined number of barrier layers;
    determining, by the processor, a thickness of a reactive layer based at least in part on the determined number of transmission layers and the determined number of barrier layers;

printing, by one or more printer heads of the printer system, the reactive layer onto print media such that at least a portion of the reactive layer is configured to migrate through the determined number of transmission layers;

printing, by the one or more printer heads, the determined number of transmission layers and the determined number of barrier layers in alternation with one another; and printing, by the one or more printer heads, a reactant layer that is configured to change color responsive to a reaction that occurs between the reactant layer and the reactive layer upon migration of the reactive layer through the determined number of transmission layers, wherein the reaction is configured to occur on the expiration date.

11. The method of claim 10, further comprising receiving, by an interface of the printer system, the expiration date.

12. The method of claim 10, wherein determining the porosity includes determining a size of pores, a pattern of pores, and a number of pores included in each barrier layer.

\* \* \* \* \*